US011340932B2

(12) United States Patent
Wang et al.

(10) Patent No.: US 11,340,932 B2
(45) Date of Patent: May 24, 2022

(54) PACKET HANDLING BASED ON MULTIPROCESSOR ARCHITECTURE CONFIGURATION

(71) Applicant: VMware, Inc., Palo Alto, CA (US)

(72) Inventors: Yong Wang, San Jose, CA (US); Boon Seong Ang, Saratoga, CA (US); Guolin Yang, San Jose, CA (US); Wenyi Jiang, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/751,193

(22) Filed: Jan. 23, 2020

(65) Prior Publication Data
US 2021/0232417 A1     Jul. 29, 2021

(51) Int. Cl.
| | |
|---|---|
| *G06F 15/16* | (2006.01) |
| *G06F 9/455* | (2018.01) |
| *G06F 9/50* | (2006.01) |
| *H04L 43/0817* | (2022.01) |
| *H04L 43/16* | (2022.01) |
| *H04L 12/46* | (2006.01) |
| *G06F 9/54* | (2006.01) |

(52) U.S. Cl.
CPC ...... *G06F 9/45558* (2013.01); *G06F 9/45545* (2013.01); *G06F 9/5016* (2013.01); *G06F 9/546* (2013.01); *H04L 12/4641* (2013.01); *H04L 43/0817* (2013.01); *H04L 43/16* (2013.01); *G06F 2009/45595* (2013.01)

(58) Field of Classification Search
CPC ............. G06F 12/0842; G06F 9/45558; G06F 9/45545; G06F 9/5019; G06F 9/5016; G06F 9/546; H04L 12/4641; H04L 43/0817; H04L 43/16

USPC ........................................................ 709/224
See application file for complete search history.

(56) References Cited

U.S. PATENT DOCUMENTS

| | | | |
|---|---|---|---|
| 2010/0014526 A1* | 1/2010 | Chavan ................. | H04L 12/467 370/395.53 |
| 2013/0031544 A1* | 1/2013 | Sridharan ........... | G06F 9/45558 718/1 |

(Continued)

OTHER PUBLICATIONS

M. Rhu, M. Sullivan, J. Leng and M. Erez, "A locality-aware memory hierarchy for energy-efficient GPU architectures," 2013 (Year: 2013).*

(Continued)

*Primary Examiner* — Oscar A Louie
*Assistant Examiner* — Messeret F Gebre
(74) *Attorney, Agent, or Firm* — Su IP Consulting (57) ABSTRACT

Example methods and systems for packet handling based on a multiprocessor architecture configuration are provided. One example method may comprise: in response to receiving a first ingress packet that requires processing by a first virtual central processing unit (VCPU) running on the first node, steering the first ingress packet towards a first receive (RX) queue and performing local memory access on the first node to access the first ingress packet from the first RX queue. The method may also comprise: in response to receiving a second ingress packet that requires processing by a second VCPU running on the second node, steering the second ingress packet towards a second RX queue and performing local memory access on the second node to access the second ingress packet from the second RX queue.

21 Claims, 7 Drawing Sheets

(56) References Cited

U.S. PATENT DOCUMENTS

2017/0149698 A1* 5/2017 Tsirkin ................ G06F 9/45558
2017/0289036 A1* 10/2017 Vasudevan .............. H04L 49/70
2017/0364279 A1* 12/2017 Banerjee ............... G06F 3/0611
2019/0173841 A1* 6/2019 Wang .................. H04L 63/0428

OTHER PUBLICATIONS

Thuresson, M., Spracklen, L., & Stenstrom, P. (2008). Memory-link compression schemes: A value locality perspective. IEEE Transactions on Computers, 57(7), 916-27 (Year: 2008).*

K. Kumar, M. Dimitrov and K. Doshi, "Energy efficient DRAM row buffer management for enterprise workloads," 2010 International Conference on Energy Aware Computing, 2010, pp. 1-4 (Year: 2010).*

H. Li, C. Yang and H. Tseng, "Energy-Aware Flash Memory Management in Virtual Memory System," in IEEE Transactions on Very Large Scale Integration (VLSI) Systems, vol. 16, No. 8, pp. 952-964, Aug. 2008 (Year: 2008).*

* cited by examiner

PACKET HANDLING BASED ON MULTIPROCESSOR ARCHITECTURE CONFIGURATION

BACKGROUND

Virtualization allows the abstraction and pooling of hardware resources to support virtual machines in a virtualized computing environment, such as a Software-Defined Datacenter (SDDC). For example, through server virtualization, virtual machines running different operating systems may be supported by the same physical machine (e.g., referred to as a "host"). Each virtual machine is generally provisioned with virtual resources to run an operating system and applications, including virtual network interface controller (VNIC), virtual central processing unit (VCPU), guest physical memory, virtual disk, etc. Using a multiprocessor architecture such as a non-uniform memory access (NUMA), memory access time on a host depends on a memory location relative to a processor. In practice, packet handling at the host with the multiprocessor architecture may lack efficiency due to remote memory access.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Figure 1:
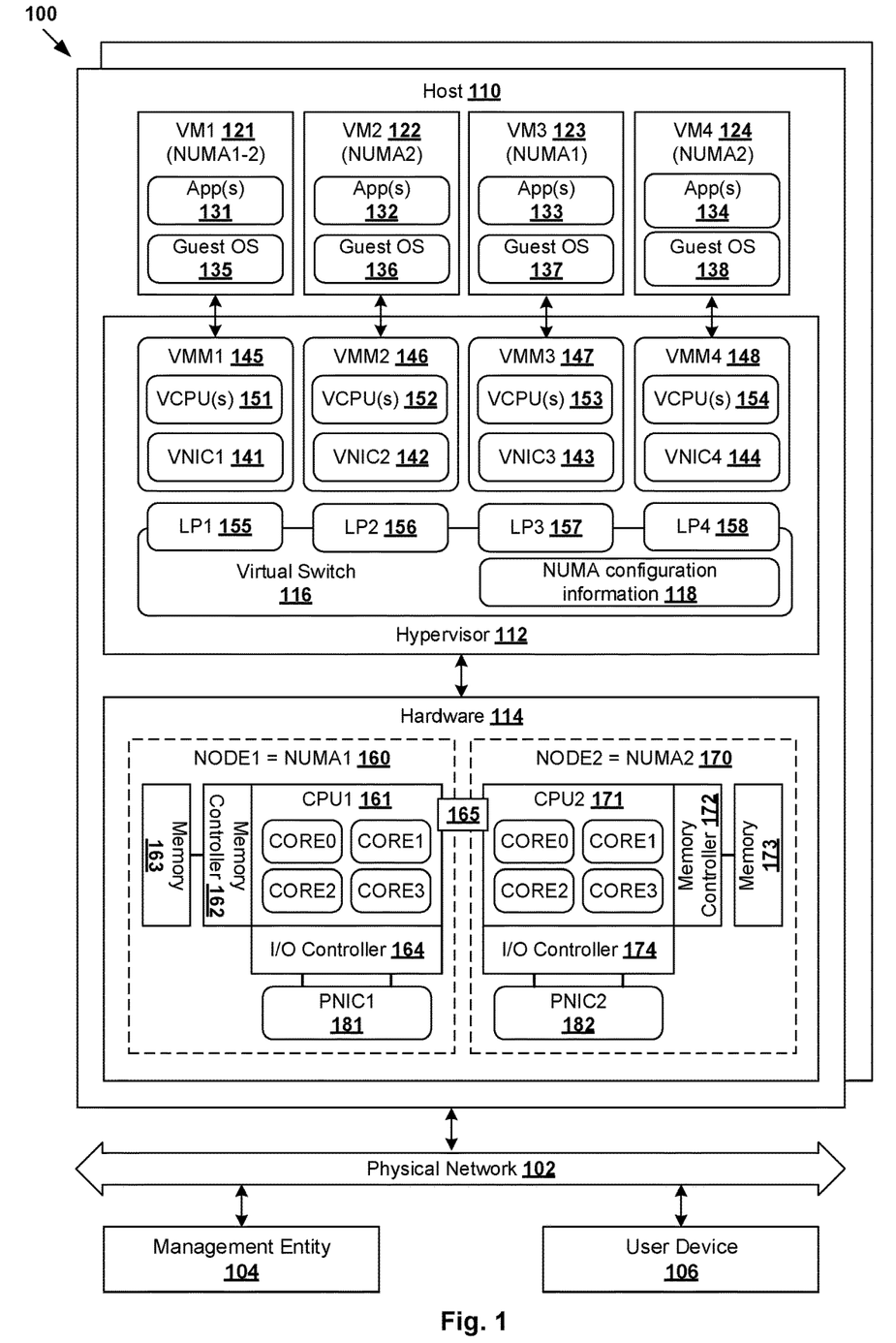
FIG. 1 is a schematic diagram illustrating an example virtualized computing environment in which packet handling based on multiprocessor architecture configuration may be performed.

FIG. 1 is a schematic diagram illustrating example virtualized computing environment 100 in which packet handling based on multiprocessor architecture configuration may be performed. Depending on the desired implementation, virtualized computing environment 100 may include additional and/or alternative components than that shown in FIG. 1. Although the terms "first" and "second" are used throughout the present disclosure to describe various elements, these elements should not be limited by these terms. These terms are used to distinguish one element from another. For example, a first element may be referred to as a second element, and vice versa.

In the example in FIG. 1, virtualized computing environment 100 includes multiple hosts 110 (one shown in detail for simplicity; also known as "computer systems", "host computers", "host devices", "physical servers", "server systems", etc.) that are connected to physical network 102. Each host 110 includes suitable virtualization software (e.g., hypervisor 112) and hardware 114 to support virtual machines (VMs), such as VM1 121, VM2 122, VM3 123 and VM4 124. Although one host 110 and four VMs 121-124 are shown in detail, there may be multiple hosts in virtualized computing environment 100, each supporting tens or hundreds of VMs.

Hypervisor 112 maintains a mapping between underlying hardware 114 of host 110 and virtual resources allocated to respective VMs 121-124. Virtual resources are allocated to VMs 121-124 to support respective applications 131-134 and guest operating systems (OS) 135-138, etc. For example, the virtual resources may include virtual CPU, guest physical memory (i.e., memory visible to the guest OS running in a VM), virtual disk(s), virtual network interface controller (VNIC), etc. Virtual machine monitors (VMMs) 145-148 are implemented by hypervisor 112 to emulate hardware resources for VMs 121-124. For example, VMM1 145 is configured to emulate VNIC1 141 and VCPU(s) 151 for VM1 121. VMM2 146 is to emulate VNIC2 142 and VCPU(s) 15 for VM2 122. VMM3 147 is to emulate VNIC3 143 and VCPU(s) 153 for VM3 123, and VMM4 148 to emulate VNIC4 144 and VCPU(s) 154 for VM4 124. In practice, VMMs 145-148 may be considered as components that are part of respective VMs 121-124, or alternatively, separated from VMs 121-124. In both cases, VMMs 145-148 each maintain state information of respective VNICs 141-144 to facilitate VM migration.

Although examples of the present disclosure refer to VMs, a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" may refer generally to a link layer or media access control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 112 further implements virtual switch 116 to handle traffic forwarding to and from VMs 121-124. For example, VMs 121-124 may send egress (i.e., outgoing) packets and receive ingress packets (i.e., incoming) via respective VNICs 141-144 and logical ports 155-158 during a communication session with another node (e.g., virtual machine, physical host, etc.) connected via physical network 102. In this case, VMs 121-124 may each act as an endpoint of a bi-directional inter-process communication flow with another endpoint. For example, an endpoint may be capable of creating a socket to facilitate the communication flow, such as Transmission Control Protocol (TCP) sockets, raw Internet Protocol (IP) sockets, etc.

As used herein, the term "logical port" may refer generally to a port on a logical switch to which a virtualized computing instance is connected. A "logical switch" may refer generally to an SDN construct that is collectively implemented by multiple virtual switches, whereas a "virtual switch" may refer generally to a software switch or software implementation of a physical switch. In practice, there is usually a one-to-one mapping between a logical port on a logical switch and a virtual port on virtual switch 116. However, the mapping may change in some scenarios, such as when the logical port is mapped to a different virtual port on a different virtual switch after migration of the corresponding virtualized computing instance (e.g., when the source and destination hosts do not have a distributed virtual switch spanning them).

Management entity 104 provides management functionalities to manage various objects, such as hosts 110, VMs 121-124, etc. In practice, management entity 104 may be implemented by one or more virtual or physical entities. One example of a management entity is the NSX manager component of VMware NSX® (available from VMware, Inc.) that operates on a management plane. The NSX manager component may interact with an NSX controller component that operates on a central control plane. Management entity 104 may be implemented using physical machine(s), VM(s), or both. Users (e.g., network administrators) operating respective user devices 106 may access the functionalities of management entity 104 via any suitable interface, such as graphical user interface, command-line interface, Application Programming Interface (API) calls. User device 106 may be any suitable computer system, such as user workstation, client device, mobile device, etc.

Multiprocessor Architecture

Host 110 may be configured according to any suitable multiprocessor architecture, such as non-uniform memory access (NUMA), etc. In general, NUMA systems are advanced system platforms with more than one system bus and capable of harnessing a large number of processors in a single system image with superior price-to-performance ratios. In recent years, processor clock speed has increased dramatically. A multi-gigahertz central processing unit (CPU) needs to be supplied with a large amount of memory bandwidth to use its processing power effectively. Even a single CPU running a memory-intensive workload (e.g., complex packet processing) may be constrained by memory bandwidth. This problem generally is amplified on symmetric multiprocessing (SMP) systems, where many processors compete for bandwidth on the same system bus. Some high-end systems address this problem by building a high-speed data bus, but this solution is expensive and limited in scalability.

NUMA is a multiprocessor architecture for linking several smaller, more cost-effective nodes (called "NUMA nodes") using a high-performance NUMA connection. The term "node" may refer generally to a group of processor(s) and memory device(s) configured using any suitable multiprocessor architecture, such as NUMA, cache-coherent NUMA (ccNUMA), or the like. An advanced memory controller allows a node to use memory on all other nodes, creating a single system image. When a processor accesses (remote) memory that does not lie within its own NUMA node, the data must be transferred over the NUMA connection, which is slower than accessing local memory. Memory access times are therefore "not uniform" and depend on the location of the memory and the node from which it is accessed.

In the example in FIG. 1, host 110 includes multiple NUMA nodes, such as first NUMA node 160 ("NUMA1") and second NUMA node 170 ("NUMA2") that are interconnected via NUMA connection 165. Each NUMA node 160/170 includes multi-core CPU 161/171, memory controller 162/172, host physical memory 163/173, Input/Output (I/O) controller 164/174, etc. As used herein, the term "local memory" may refer generally to the memory that is accessible by an element supported by the same node, and the term "remote memory" to the memory that is on a different node. For example, first physical CPU 161 ("CPU1") may access its local memory 163 on the same on NUMA1 160 faster than remote memory 173 on different NUMA2 170. Similarly, second physical CPU 171 ("CPU2") on NUMA2 170 may access its local memory 173 faster than remote memory 163 on NUMA1 160. The shared memory functionality is provided by via NUMA connection 165.

Depending on the desired implementation, host 110 (e.g., using an entity called NUMA scheduler) may assign each VM to at least one "home node" to improve performance. For example, VMs 122-124 are assigned to NUMA2 170, NUMA1 160 and NUMA2 170, respectively. By assigning VM2 122 to NUMA2 170, VCPUs 152 will be supported by second CPU 171. Memory locality is also preferred, which means host 110 preferentially allocates VM2 122 with guest physical memory (not shown) from host physical memory 173 on NUMA2 170.

For VM1 121, multiple NUMA nodes 160-170 may be used to support its application(s) 131 and guest OS 135. This way, VM1 121 may achieve higher processing capability using both physical CPU1 161 and CPU2 171. For VM1 121, VNIC 141 represents a software emulation of PNIC 181/182. VNIC emulation generally adds to the layers of networking software, including receiving/transmitting packets from/to virtual switch 116 and PNIC 181/182. Here, the term "emulation" may refer generally to a software implementation of a physical device.

In practice, however, the ability for VCPUs 151 to access both its own local memory and remote memory poses challenges for hypervisor and/or kernel designers. The challenges stem from the slower remote read/write operations, as well as limited bandwidth and asymmetric nature of interconnect 165 between NUMA1 160 and NUMA2 170. This causes performance degradation, which in turn affects the performance of other VMs and applications that relies on VM1 121 in virtualized computing environment 100. This is undesirable, especially for latency-sensitive traffic.

Figure 2:
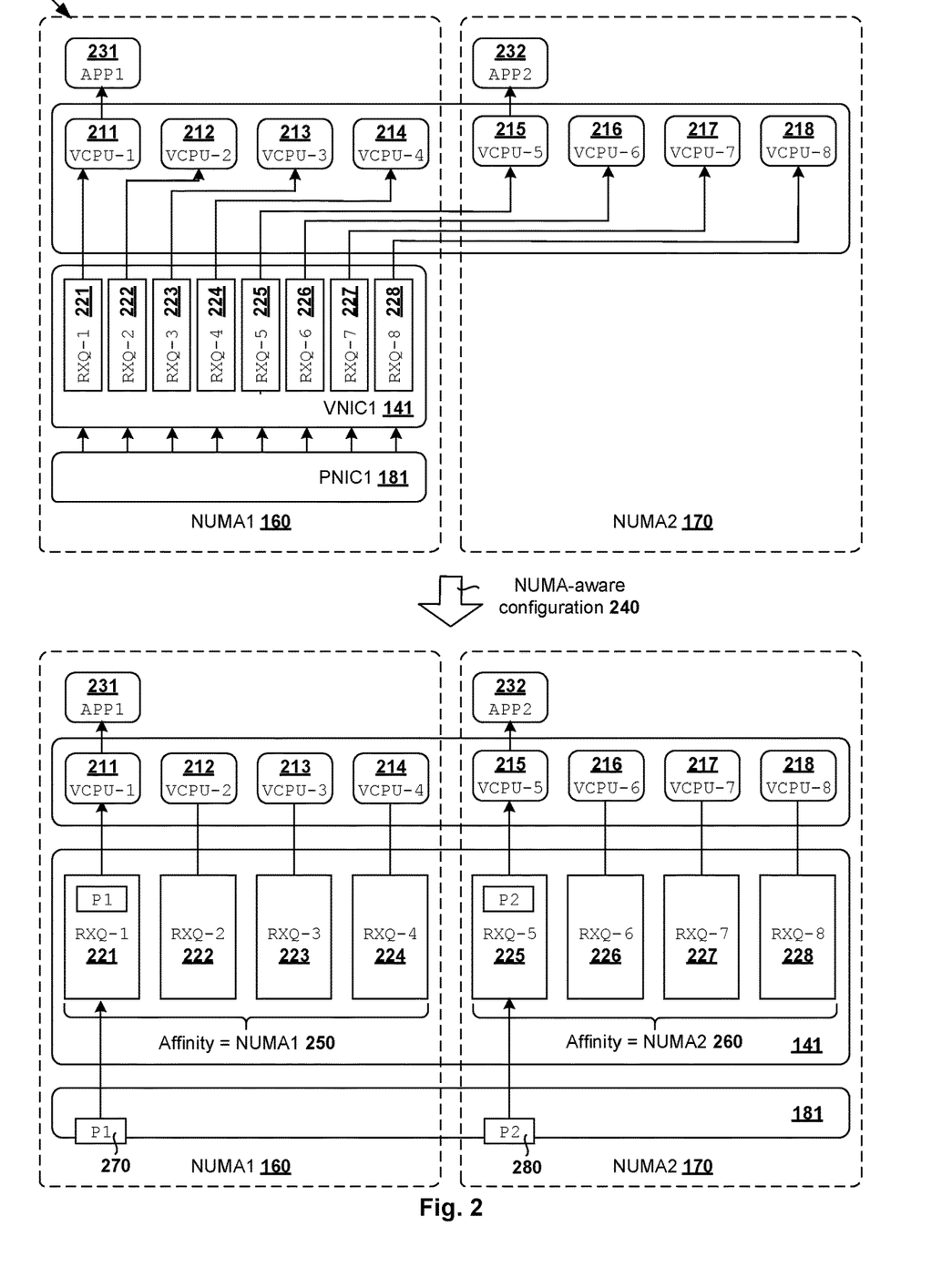
FIG. 2 is a schematic diagram illustrating an example of packet handling based on multiprocessor architecture configuration.

In more detail, FIG. 2 is a schematic diagram illustrating example 200 of packet handling based on multiprocessor architecture configuration. In this example, VM1 121 may be allocated with multiple (N) VCPUs that are managed using guest OS 135. The VCPUs (collectively represented as 151 in FIG. 1) may be denoted as VCPU-1, ..., VCPU-8 (see 211-218) for the case of N=8. Further, VNIC1 141 may support multiple receive (RX) queues (see 221-228) for ingress packet processing, as well as transmit (TX) queues (not shown) for egress packet processing. For N=M=8, RX queues 221-228 (denoted as RXQ-1, ..., RXQ-M) may be mapped to respective VCPUs 211-218. This way, ingress packets destined for applications 131 running on VM1 121 may be steered towards one of RX queues 221-228, thereby distributing processing load among VCPUs 221-228.

Conventionally, VM1 121 might not be aware of the underlying multiprocessor architecture. Referring to the top half of FIG. 2, VNIC1 141 may be attached to NUMA1 160 only. Within VNIC1 141, a first queue set=(RXQ-1, ..., RXQ-4) 221-224 may be mapped to (VCPU-1, ..., VCPU-4) 211-214 supported by (i.e., running on) NUMA1 160. However, a second queue set=(RXQ-5, ..., RXQ-8) 225-228 may be mapped to (VCPU-5, ..., VCPU-8) 215-218 supported by (i.e., running on) NUMA2 170. During packet handling, packets dispatched to the second queue set=(RXQ-5, ..., RXQ-8) will be copied from NUMA1 160 to NUMA2 170 using remote memory access. This is undesirable because remote memory access is inefficient and reduces the effective bandwidth of NUMA connection 165, leading to performance issues.

NUMA-Aware Packet Handling

According to examples of the present disclosure, VM1 121 may be reconfigured (see 240 in FIG. 2) to perform packet handling based on multiprocessor architecture configuration. For example, a "NUMA-aware" approach may be implemented to avoid or reduce the likelihood of remote memory access. This way, memory access latency may be reduced during packet handling compared to conventional approaches that do not consider the underlying multiprocessor architecture configuration.

At 240 in FIG. 2, NUMA-aware configuration may involve attaching VNIC 141 to multiple NUMA nodes, such as both NUMA1 160 and NUMA2 170 in FIG. 2. The attachment may be made to improve the performance of "large" VM1 121 that requires high packet processing capability. For example, VM1 121 may implement may be an edge appliance or node capable of performing functionalities of a switch, router, bridge, gateway, any combination thereof, etc. In this case, VM1 121 may provide various networking services, such as firewall, load balancing, network address translation (NAT), intrusion detection, deep packet inspection, etc. VM1 121 may be deployed to connect one data center site with an external network and/or another site.

At 250 in FIG. 2, a first queue set=(RXQ-1, ..., RXQ-4) 221-224 of VNIC1 141 may be allocated with memory resources from NUMA1 160 and first VCPU set=(VCPU-1, ..., VCPU-4) 211-214 running on same NUMA1 160. To facilitate local memory access, the first queue set may be allocated with memory resources from physical memory 163 on NUMA1 160. At 260, a second queue set=(RXQ-5, ..., RXQ-8) 225-228 of VNIC1 141 may be allocated with memory resources NUMA2 170 and second VCPU set=(VCPU-5, ..., VCPU-8) 215-218 running on same NUMA2 170. To facilitate local memory access, the second queue set may be allocated with memory resources from physical memory 173 on NUMA2 170.

The example in FIG. 2 will be explained using FIG. 3, which is a flowchart of example process 300 for a computer system to perform packet handling based on multiprocessor architecture configuration. Example process 300 may include one or more operations, functions, or actions illustrated by one or more blocks, such as 310 to 360. The various blocks may be combined into fewer blocks, divided into additional blocks, and/or eliminated depending on the desired implementation. Although NUMA will be used as an example "multiprocessor architecture" below, any suitable alternative multiprocessor architecture may be implemented to support a "first node" and a "second node." Examples of the present disclosure may be performed by a computer system in the form of host 110, such as using NUMA configuration information 118 indicating various elements' affinity with NUMA1 160 and/or NUMA2 170.

Figure 3:
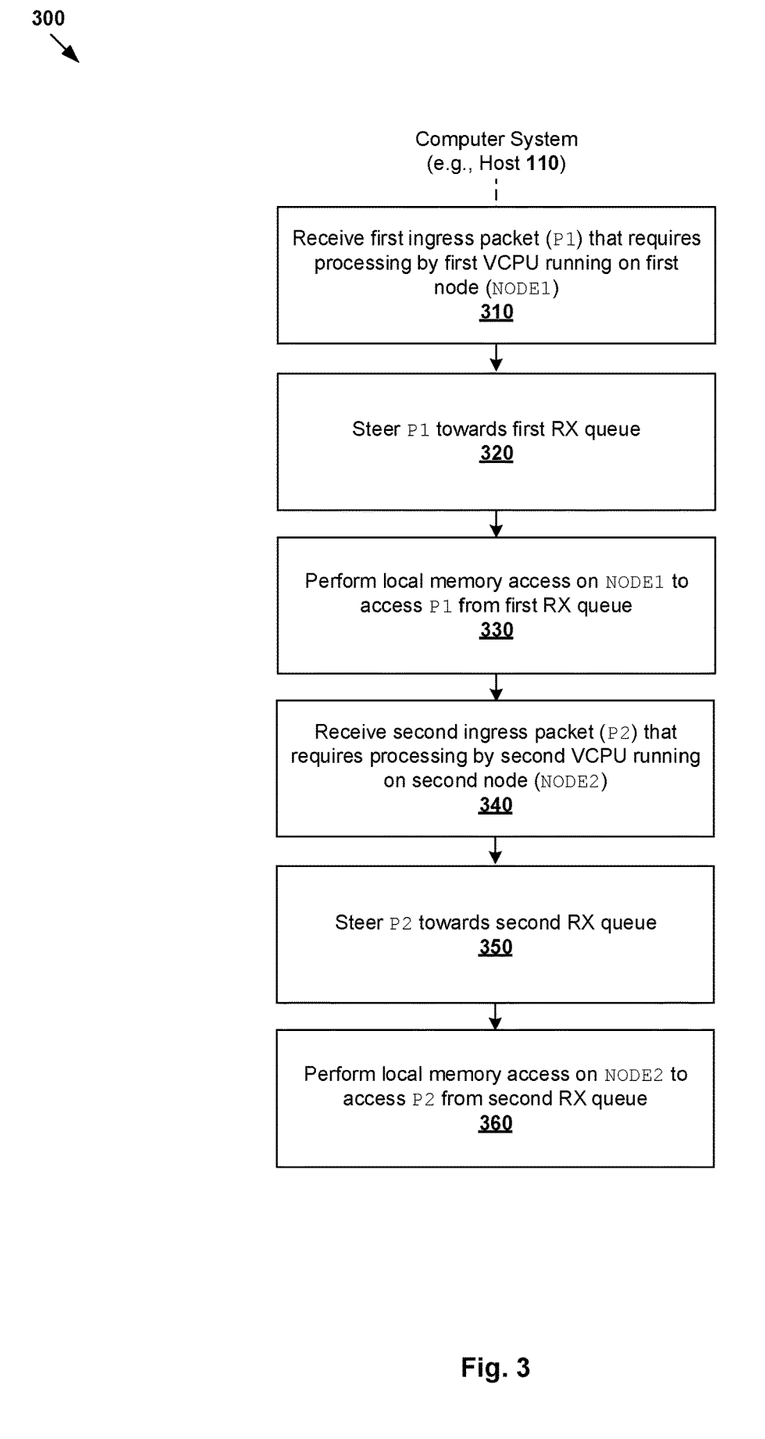
FIG. 3 is a flowchart of an example process for a computer system to perform packet handling based on multiprocessor architecture configuration.

At 310 and 320 in FIG. 3, in response to receiving first ingress packets (see "P1" 270 in FIG. 2) that requires processing by first VCPU=VCPU-1 211 running on NUMA1 160, ingress packets 270 may be steered towards first RX queue=RXQ-1 221, which is allocated with memory from NUMA1 160. For example, "P1" 270 may require processing by VCPU-1 211 because "P1" 270 is destined for APP1 231 running or executing on VCPU-1 211. At 330, APP1 231 or first VCPU=VCPU-1 211 may perform local memory access on NUMA1 160 to access ingress packets "P1" 270 from first RX queue 221. Here, first RX queue=RXQ-1 221 is allocated with memory from physical memory 163 on NUMA1 160, which is "local memory" to first VCPU=VCPU-1 211 running on same NUMA1 160.

At 340 and 350 in FIG. 3, in response to receiving second ingress packets (see "P2" 280 in FIG. 2) that requires processing by second VCPU=VCPU-5 215 running on NUMA2 170, ingress packets 280 may be steered towards second RX queue=RXQ-5 225, which is allocated with memory from NUMA2 170. Similarly, "P2" 280 may require processing by VCPU-5 215 because "P2" 280 is destined for APP2 232 that is running on VCPU-5 215. At 360, APP2 232 or second VCPU=VCPU-5 215 may perform a local memory access on NUMA2 170 to access ingress packets "P2" 280 from second RX queue 225. Here, second RX queue=RXQ-5 225 is allocated with memory from physical memory 173 on NUMA2 170, which is "local memory" to second VCPU=VCPU-5 215 running on same NUMA2 170.

As will be described further below, VNIC1 141 may be referred to as a "NUMA-aware" VNIC1 141 that leverages capabilities of underlying PNIC1 181. By steering traffic towards RX queues 221-228 and VCPUs 211-218 based on their node affinity, remote memory access may be reduced, if not avoided, at VM1 121 spanning both NUMA1 160 and NUMA2 170. This reduces the overall overhead relating data transfer over NUMA interconnection 165 between NUMA1 160 and NUMA2 170.

In practice, the term "application" (e.g., 231/232) may refer generally to software program(s), service(s), process(es) or executable instruction(s). For example, application 231/232 running on VM1 122 may be a networking service, containerized application, etc. Various examples will be discussed with FIG. 4, FIG. 5 and FIG. 6 below. For TX packet processing, memory access for packet processing is generally local, and will not be discussed in detail for brevity.

NUMA-Aware Configuration

Figure 4:
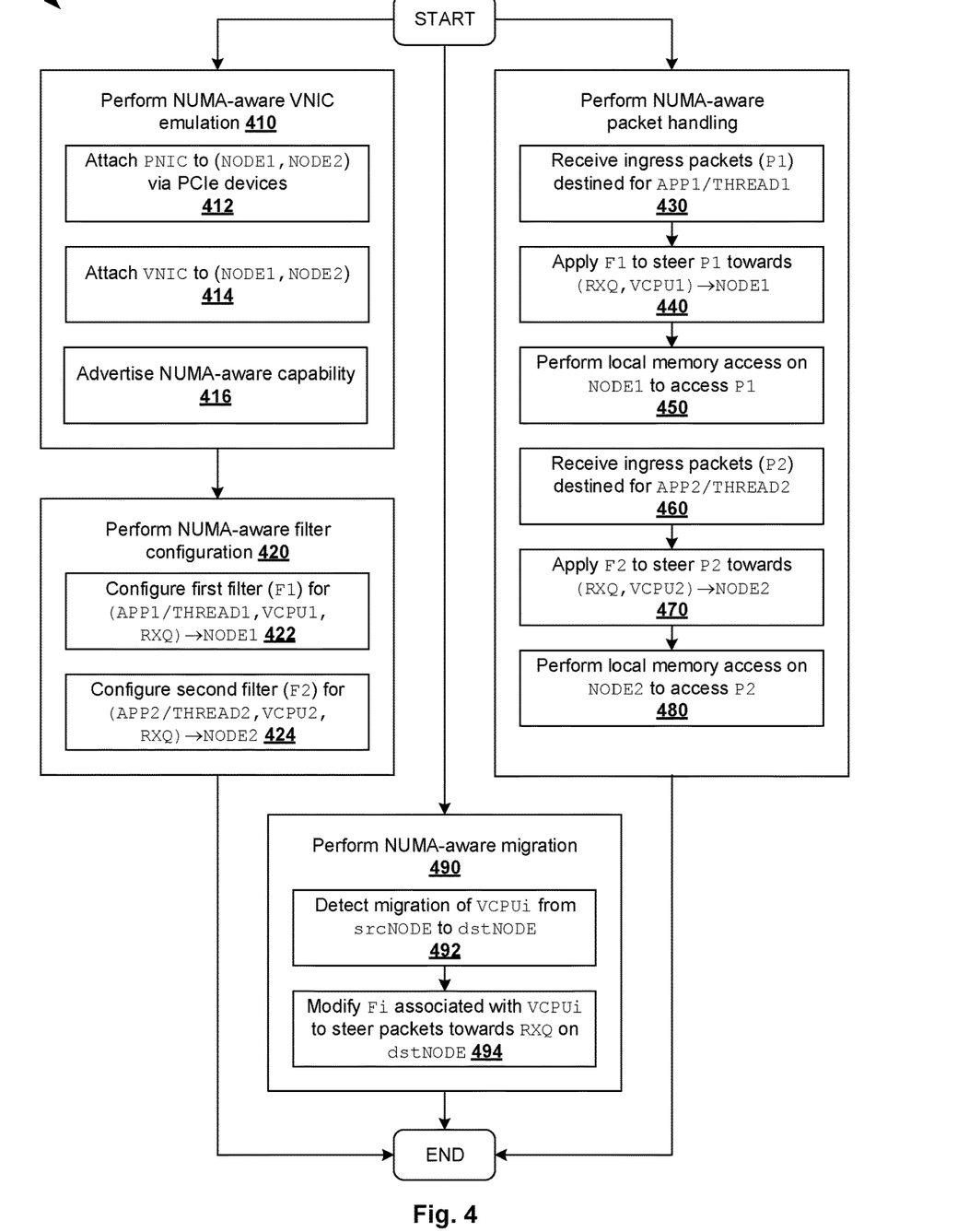
FIG. 4 is a flowchart of an example process for a computer system to perform configuration and packet handling based on multiprocessor architecture configuration.

FIG. 4 is a schematic diagram of example process 400 for computer system 110 to perform configuration and packet handling based on multiprocessor architecture configuration. Example process 400 may include one or more operations, functions, data blocks or actions illustrated at 410 to 494. The various operations, functions or actions may be combined into fewer blocks, divided into additional blocks, and/or eliminated depending on the desired implementation. The example in FIG. 4 will be explained using FIG. 5, which is a schematic diagram illustrating first example 500 of packet handling based on multiprocessor architecture configuration.

(a) NUMA-Aware VNIC Emulation

At 410 in FIG. 4, NUMA-aware VNIC emulation may be performed to configure VNIC1 141. For example, at 412, PNIC1 181 may be attached to both NUMA1 160 and NUMA2 170 via separate peripheral component interconnect express (PCIe) interfaces. In the example in FIG. 5, block 412 may involve attaching PNIC1 181 to NUMA1 160 and NUMA2 170 via respective PCIe devices labelled as "PCIe1" 501 and "PCIe2" 502. In practice, the PCIe devices 501-502 may be plugged into slots on different NUMA nodes and connected by a cable. Each PCIe device 501/502 may support multiple RX and TX queues. The primary device (e.g., the PCIe device with more chips) may be used to steer RX packets to first queue set 221-224 supported by NUMA1 160, or second queue set 225-258 supported by NUMA2 170. A PNIC driver (not shown) may register a single uplink object (e.g., vmnicX) to a networking stack running on host 110 after claiming both PCIe devices 501-502.

At 414 in FIG. 4, VNIC1 141 may be attached to both NUMA1 160 and NUMA2 170 by allocating first queue set=(RXQ-1, . . . , RXQ-4) with memory from NUMA1 160 and second queue set=(RXQ-5, . . . , RXQ-8) from NUMA2 170. As used herein, the term "queue" may be a buffer with any suitable data structure, such as cyclic array (e.g., ring buffer), linked list, etc. Using NUMA-aware VNIC emulation, memory allocation based on NUMA locality may be implemented to allocate first queue set 211-214 with "local memory" from guest physical memory that is mapped to host physical memory 163 on NUMA1 160. Second queue set 215-218 is allocated with "local memory" from guest physical memory that is mapped to physical memory 173 on NUMA2 170.

At 416 in FIG. 4, the NUMA-aware uplink capability of VNIC1 141 may be reported or advertised to VM1 121. In the example in FIG. 5, PNIC1 181 may advertise various resource(s) associated with the NUMA-aware uplink capability, such as an uplink object (e.g., vmnicX) resides on NUMA1 160 and NUMA2 170; the number of RX queues supported by PNIC1 180 that reside on NUMA1 160 and NUMA2 170; support for packet filters based on receive-side scaling (RSS), destination MAC address (DMAC), layer-3 information, layer-4 information, application-layer information, or any combination thereof.

In practice, block 410 may involve the NIC driver configuring a netpoll context for each RX queue. The NIC driver may also pre-allocate buffer(s) for each RX queue. The buffer is allocated from the same NUMA node (e.g., NUMA1 160) where the Rx queue is located (e.g., RXQ-1 221). From the perspective of a virtualization interface (e.g., vmkernel developed by VMware, Inc.) associated with VM1 121, the uplink object=vmnicX spans both NUMA1 160 and NUMA2 170, it has a netpoll context running on each NUMA node 160/170, and it supports packet steering to either NUMA node 160/170 according to filter settings.

(b) NUMA-Aware Filter Configuration

At 420 in FIG. 4, packet filters may be configured to steer ingress packets towards one of RX queues 221-228 based on the NUMA node affinity of their destination. In the example in FIG. 5, since APP1 231 is being executed by VCPU-1 211 running on NUMA1 160, local memory access may be achieved by steering packets destined for APP1 231 to one of RX queues 211-214. In this case, VM1 121 (or APP1 231) may configure a first filter (see "F1" 510) based on the affinity of (VCPU-1, RXQ-1) with NUMA1 160. First filter 510 may specify various match fields, such as source information (IP address=IP-A, service port number=PN-A) associated with a remote server A (not shown), destination information (IP address=IP-VNIC1, port number=PN1) associated with APP1 231 and protocol=TCP. If there is a match, action=steer packet towards RXQ-1 221 may be performed. See 422 in FIG. 4.

Similarly, since APP2 232 is supported by VCPU-5 215 running on NUMA2 170, local memory access may be achieved by steering packets destined for APP2 232 to one of RX queues 215-218 in the second queue set. In this case, VM1 121 (using guest OS 135 or APP2 232) may configure a second filter (see 520) at PNIC1 181 based on the affinity of (VCPU-5, RXQ-5) with NUMA2 170. For example, second filter 520 may specify match fields that includes source information (IP address=IP-A, service port number=PN-A) associated with a remote server A (not shown), destination information (IP address=IP-VNIC1, port number=PN2) associated with APP2 232 and protocol=TCP. If there is a match, action=steer packet towards RXQ-5 225 may be performed. See 424 in FIG. 4.

Figure 5:
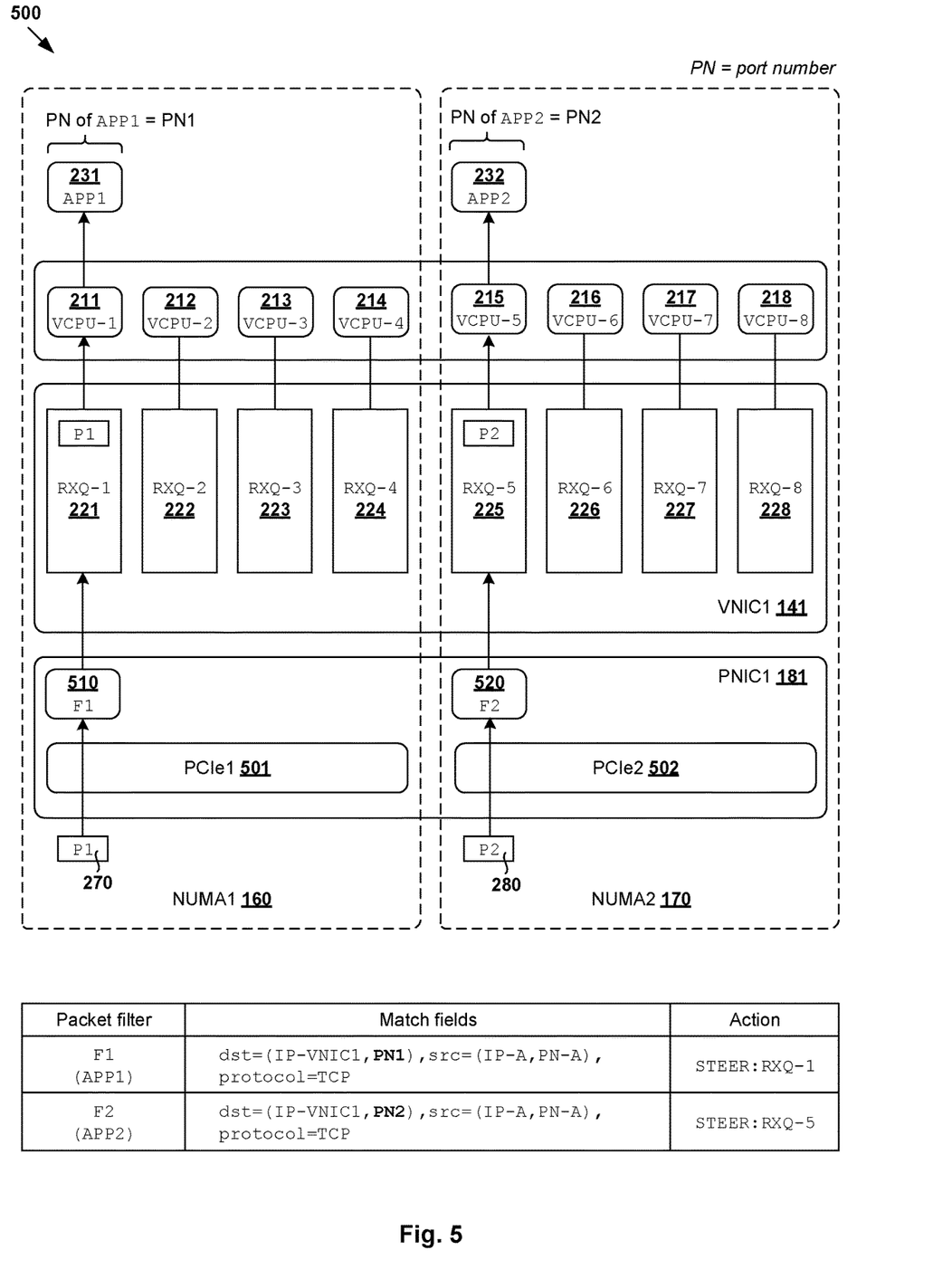
FIG. 5 is a schematic diagram illustrating a first example of packet handling based on multiprocessor architecture configuration.

The match fields of filter 510/520 may specify any suitable content or characteristic(s) of ingress packets, such as header information, packet payload information, packet metadata, or any combination thereof, etc. The header information may be layer-2, layer-3, layer-4 or application-layer information. Example inner/outer header information may include source IP address, source MAC address, source port number, destination IP address, destination MAC address, destination port number, destination port number, protocol (e.g., TCP, UDP), logical overlay network information, or any combination thereof, etc. In practice, filtering may involve applying a hash function to packet characteristic(s) to achieve receive-side scaling (RSS).

Using the above examples, different applications 231-232 supported by VM1 121 may be distinguished based on their destination port numbers (e.g., TCP or UDP port number). If VNIC1 141 is configured with multihoming, destination IP address may also be used to distinguish applications 231-232 because they can bind to the same port of different IP addresses. Depending on the desired implementation, block 420 may be implemented using guest OS 135, which may keep track of the owner of each filter (e.g., based on the destination port number specified by the filter). Whenever application 231/232 is migrated to a destination virtual NUMA node, guest OS 135 may move associated filter 510/520. This may be performed by a VNIC guest driver based on a notification from guest OS 135.

NUMA-Aware Packet Handling

At 430 and 440 in FIG. 4, in response to receiving a first packet (see 270 in FIG. 5) that is destined for APP1 231, first filter 520 may be applied to steer first packet 270 towards RXQ-1 221. This way, at 450, APP1 231 running on VCPU-1 211 may perform local memory access to access first packet 270 based on the node affinity of (APPLVCPU-1, RXQ-1) with NUMA1 160.

Further, at 460 and 470 in FIG. 4, in response to receiving a second packet (see 280 in FIG. 5) that is destined for APP2 232, second filter 530 may be applied to steer second packet 280 towards RXQ-5 225. This way, at 480, APP2 232 running on VCPU-5 215 may perform local memory access to access packet 280 based on the node affinity of (APP2, VCPU-5, RXQ-5) with NUMA2 170.

Depending on the desired implementation, the RX netpoll context discussed above may be woken up by an interrupt service routine that is invoked upon RX interrupt fired by PNIC 181 to steer packets towards the correct host memory 163/173. The netpoll context may then reap packets from its RX queues in a batch, push them to a vmkernel networking stack. Next, packet buffer may be copied from vmkernel memory to guest memory of VM1 121 supported by a guest driver on VNIC1 141. Using the NUMA-aware approach, packet processing performance may be improved.

NUMA-Aware Migration

According to examples of the present disclosure, NUMA-aware migration may be performed to maintain NUMA node affinity to facilitate post-migration local memory access. Block 490 in FIG. 4 will be explained using FIG. 6, which is a schematic diagram illustrating example of virtual device migration based on multiprocessor architecture configuration. Here, the term "virtual device" may refer generally to a virtualized, software-implemented component of host 110, such as VCPU-1 211 in FIG. 6.

Figure 6:
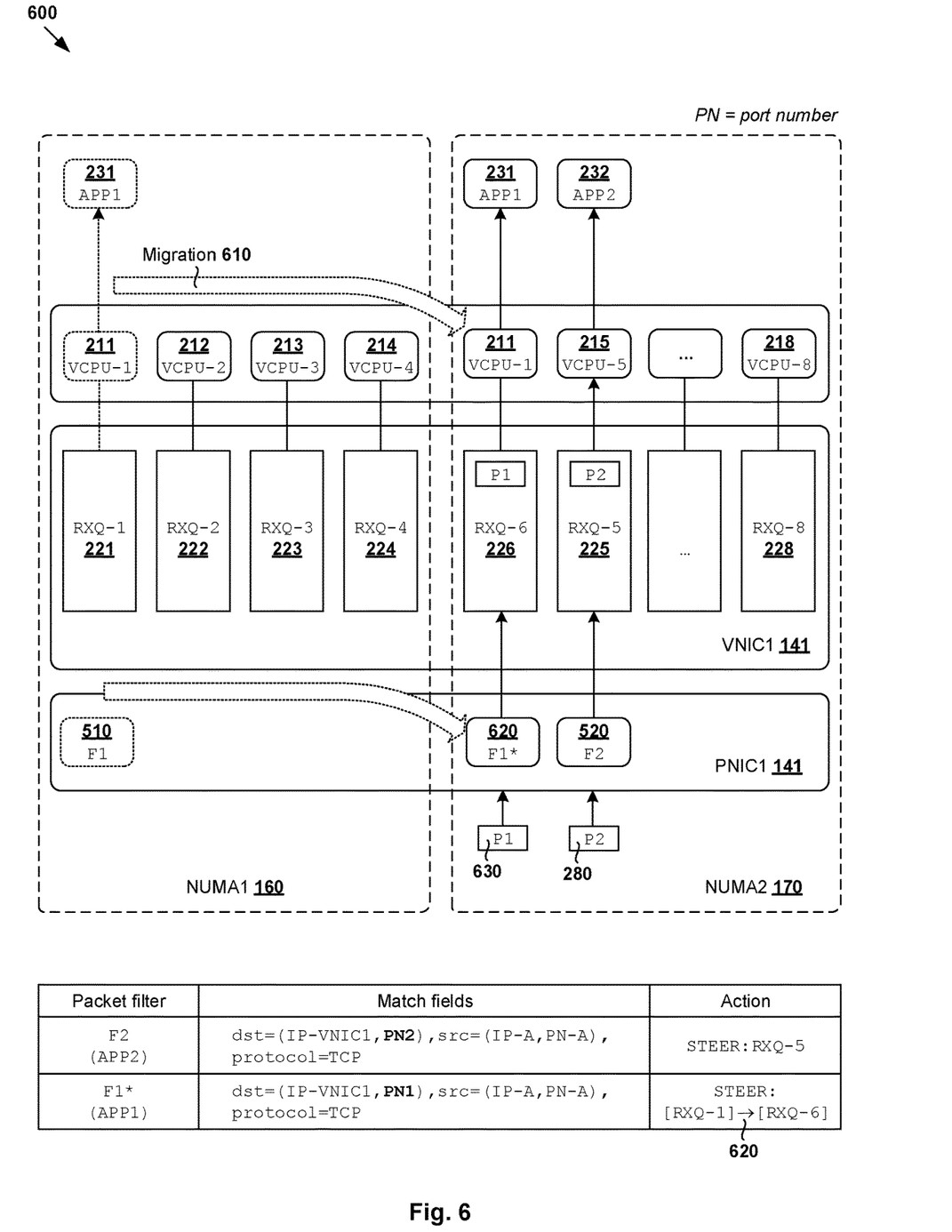
FIG. 6 is a schematic diagram illustrating an example virtual device migration based on multiprocessor architecture configuration.

At 610 in FIG. 6, VCPU-1 211 may be migrated from source=NUMA1 160 to destination=NUMA2 170, and mapped to RXQ-6 226. At 620, in response to detecting the migration, first filter (F1*) may be modified to steer subsequent ingress packets (see 630) destined for APP1 231 towards RXQ-6 226 supported by NUMA2 170, instead of NUMA1 160. This has the effect of "migrating" first filter 520 to maintain node affinity of (APPLVCPU-1, RXQ-6) with the same NUMA2 170. See also 492 and 494 in FIG. 4.

Depending on the desired implementation, block 490 may involve VCPU-1 211 notifying a VNIC guest driver (not shown) to migrate associated packet flows destined for APP1 132 to NUMA2 170. The VNIC guest driver then notifies backend module(s) of VNIC1 141 about the filter migration. The backend module(s) of VNIC1 141 may then notify a PNIC driver of PNIC1 81 to migrate the first filter, such as by modifying action=steer towards RXQ-1 221 to new action=steer towards RXQ-6 226. Similar filter migration may be performed for other VCPUs to facilitate local memory access during packet processing.

Single Application Spanning Multiple VCPUs

Figure 7:
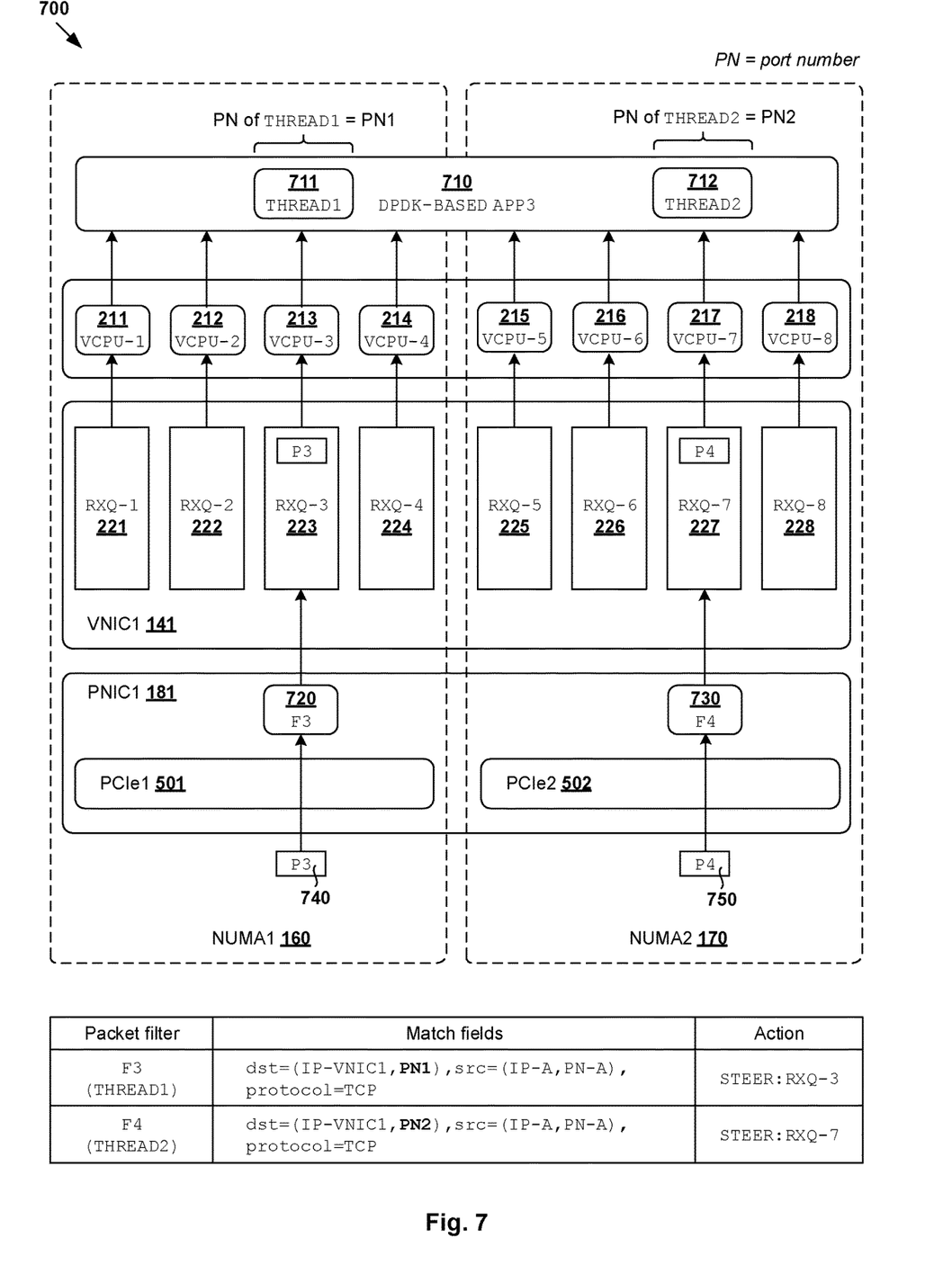
FIG. 7 is a schematic diagram illustrating a second example of packet handling based on multiprocessor architecture configuration.

Examples of the present disclosure may be implemented to perform packet handling for a single application spanning multiple VCPUs 211-218. An example is shown in FIG. 7, which is a schematic diagram illustrating second example 700 of packet handling based on multiprocessor architecture configuration. Here, application "APP3" 710 running inside VM1 121 may span (and therefore run on) multiple VCPUs 211-218. In practice, APP3 710 may be an edge appliance configured to perform any data-plane packet processing. One example is the Data Plane Development Kit (DPDK), which is an open-source Linux Foundation project that provides a set of data-plane libraries and (physical or virtual) NIC drivers to accelerate fast packet processing. A driver in a kernel of VM1 121 may be configured to manage or access RX queues 221-228 from VNIC1 141 spanning both NUMA1 160 and NUMA2 170.

Similar to the examples in FIG. 5-6, first ingress packet "P3" 740 may be steered towards RXQ-3 223 for processing by VCPU-3 213 using local memory access on NUMA1 160. This may involve applying filter "F3" 720 to steer "P3" 740 towards RXQ-3 223. Packet "P3" 740 may be destined for a first thread="THREAD1" 711 running on DPDK-based APP3 710. In this case, filter "F3" 720 may be may specify match fields that includes source information (IP address=IP-A, service port number=PN-A) associated with a remote server A (not shown), destination information (IP address=IP-VNIC1, port number=PN1) associated with THREAD1 711 and protocol=TCP. If there is a match, action=steer packet towards RXQ-3 223 may be performed. See also 422 in FIG. 4

Second ingress packet "P4" 750 may be steered towards RXQ-7 227 according to filter "F4" 730 for processing by VCPU-7 217 using local memory access on NUMA2 170. For example, packet "P4" 750 may be destined for a second thread="THREAD2" 712 running on APP3 710. In this case, filter "F4" 730 may be may specify match fields that includes source information (IP address=IP-A, service port number=PN-A) associated with a remote server A (not shown), destination information (IP address=IP-VNIC1, port number=PN2) associated with THREAD2 712 and protocol=TCP. If there is a match, action=steer packet towards RXQ-7 227 may be performed. See also 424 in FIG. 4. In practice, filter 720/730 may be configured by VM1 121, such as using guest OS 135 to keep track of the owner of each filter 720/730. Other implementation details explained using FIGS. 4-6 may be applied to, or adapted for, the example in FIG. 7. These implementation details are not repeated here for brevity.

Container Implementation

Although explained using VMs 121-124, public cloud environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 7, container technologies may be used to run various containers inside respective VMs 121-124. Containers are "OS-less", meaning that they do not include any OS that could weigh 10s of Gigabytes (GB). This makes containers more lightweight, portable, efficient and suitable for delivery into an isolated OS environment. Running containers inside a VM not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 7. For example, a computer system capable of acting as host 110 may be deployed to perform packet handling based on multiprocessor architecture configuration.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a computer system to perform packet handling based on a multiprocessor architecture configuration that includes a first non-uniform memory access (NUMA) node and a second NUMA node, the method comprising:
   in response to receiving a first ingress packet that requires processing by a first virtual central processing unit (VCPU) running on the first NUMA node,
      steering the first ingress packet towards a first receive (RX) queue of a virtual network interface controller (VNIC) that is attached to both the first NUMA node and the second NUMA node; and
      performing, by the first VCPU, local memory access to access the first ingress packet from the first RX queue, wherein the first RX queue is allocated with first memory resources from first physical memory on the first NUMA node, and wherein performing the local memory access to access the first ingress packet includes locally accessing the first memory resources, of the first RX queue, at the first NUMA node using the first VCPU; and
   in response to receiving a second ingress packet that requires processing by a second VCPU running on the second NUMA node,
      steering the second ingress packet towards a second RX queue of the VNIC; and
      performing, by the second VCPU, local memory access to access the second ingress packet from the second RX queue, wherein the second RX queue is allocated with second memory resources from second physical memory on the second NUMA node, and wherein performing the local memory access to access the second ingress packet includes locally accessing the second memory resources, of the second RX queue, at the second NUMA node using the second VCPU.

2. The method of claim 1, wherein steering the first ingress packet towards the first RX queue comprises:
   applying a first filter that is configured based on affinity of the following with the first NUMA node: (a) the first RX queue and (b) the first VCPU executing a first application.

3. The method of claim 2, wherein steering the first ingress packet towards the first RX queue comprises:
   applying the first filter to match the first ingress packet to the first RX queue based on one or more of the following associated with the first application: layer-2 information, layer-3 information, layer-4 information, and application-layer information.

4. The method of claim 2, further comprising:
   prior to receiving the first ingress packet and the second ingress packet, configuring the first filter based on a request from the first application or a guest operating system (OS) running inside a virtualized computing instance connected to the VNIC.

5. The method of claim 2, further comprising:
   in response to detecting migration of the first VCPU from the first NUMA node to the second NUMA node, applying the first filter to steer a subsequent ingress packet that requires processing by the first VCPU towards the second RX queue or a third RX queue allocated with the second memory resources from the second NUMA node.

6. The method of claim 1, further comprising:
   prior to receiving the first ingress packet and the second ingress packet via a physical network interface controller (PNIC), attaching the PNIC to both the first NUMA node and the second NUMA node via respective peripheral component interconnect express (PCIe) interfaces.

7. The method of claim 1, further comprising:
   prior to receiving the first ingress packet and the second ingress packet, allocating (a) a first queue set that includes the first RX queue with the first memory resources from the first physical memory on the first NUMA node, and (b) a second queue set that includes the second RX queue with the second memory resources from the second physical memory on the second NUMA node.

8. A non-transitory computer-readable storage medium that includes a set of instructions which, in response to execution by a processor of a computer system, cause the processor to perform a method of packet handling based on a multiprocessor architecture configuration that includes a first non-uniform memory access (NUMA) node and a second NUMA node, wherein the method comprises:
   in response to receiving a first ingress packet that requires processing by a first virtual central processing unit (VCPU) running on the first NUMA node,
      steering the first ingress packet towards a first receive (RX) queue of a virtual network interface controller (VNIC) that is attached to both the first NUMA node and the second NUMA node; and
      performing, by the first VCPU, local memory access to access the first ingress packet from the first RX queue, wherein the first RX queue is allocated with first memory resources from first physical memory on the first NUMA node, and wherein performing the local memory access to access the first ingress packet includes locally accessing the first memory resources, of the first RX queue, at the first NUMA node using the first VCPU; and
   in response to receiving a second ingress packet that requires processing by a second VCPU running on the second NUMA node,
      steering the second ingress packet towards a second RX queue of the VNIC; and
      performing, by the second VCPU, local memory access to access the second ingress packet from the second RX queue, wherein the second RX queue is allocated with second memory resources from second physical memory on the second NUMA node, and wherein performing the local memory access to access the second ingress packet includes locally accessing the second memory resources, of the second RX queue, at the second NUMA node using the second VCPU.

9. The non-transitory computer-readable storage medium of claim 8, wherein steering the first ingress packet towards the first RX queue comprises:
   applying a first filter that is configured based on affinity of the following with the first NUMA node: (a) the first RX queue and (b) the first VCPU executing a first application.

10. The non-transitory computer-readable storage medium of claim 9, wherein steering the first ingress packet towards the first RX queue comprises:
   applying the first filter to match the first ingress packet to the first RX queue based on one or more of the following associated with the first application: layer-2 information, layer-3 information, layer-4 information, and application-layer information.

11. The non-transitory computer-readable storage medium of claim 9, wherein the method further comprises:
   prior to receiving the first ingress packet and the second ingress packet, configuring the first filter based on a request from the first application or a guest operating system (OS) running inside a virtualized computing instance connected to the VNIC.

12. The non-transitory computer-readable storage medium of claim 9, wherein the method further comprises:
   in response to detecting migration of the first VCPU from the first NUMA node to the second NUMA node, applying the first filter to steer a subsequent ingress packet that requires processing by the first VCPU towards the second RX queue or a third RX queue allocated with the second memory resources from the second NUMA node.

13. The non-transitory computer-readable storage medium of claim 9, wherein the method further comprises:
   prior to receiving the first ingress packet and the second ingress packet via a physical network interface controller (PNIC), attaching the PNIC to both the first NUMA node and the second NUMA node via respective peripheral component interconnect express (PCIe) interfaces.

14. The non-transitory computer-readable storage medium of claim 8, wherein the method further comprises:
   prior to receiving the first ingress packet and the second ingress packet, allocating (a) a first queue set that includes the first RX queue with the first memory resources from the first physical memory on the first NUMA node, and (b) a second queue set that includes the second RX queue with the second memory resources from the second physical memory on the second NUMA node.

15. A computer system, comprising:
   a first non-uniform memory access (NUMA) node and a second NUMA node of a multiprocessor architecture;
   a processor; and
   a non-transitory computer-readable medium having stored thereon instructions that, in response to execution by the processor, cause the processor to:
   in response to receiving a first ingress packet that requires processing by a first virtual central processing unit (VCPU) running on the first NUMA node, steer the first ingress packet towards a first receive (RX) queue of a virtual network interface controller (VNIC) that is attached to both the first NUMA node and the second NUMA node; and
   perform, by the first VCPU, local memory access to access the first ingress packet from the first RX queue, wherein the first RX queue is allocated with first memory resources from first physical memory on the first NUMA node, and wherein performance of the local memory access to access the first ingress packet includes local access of the first memory resources, of the first RX queue, at the first NUMA node using the first VCPU; and
   in response to receiving a second ingress packet that requires processing by a second VCPU running on the second NUMA node, steer the second ingress packet towards a second RX queue of the VNIC; and
   perform, by the second VCPU, local memory access to access the second ingress packet from the second RX queue, wherein the second RX queue is allocated with second memory resources from second physical memory on the second NUMA node, and wherein performance of the local memory access to access the second ingress packet includes local access of the second memory resources, of the second RX queue, at the second NUMA node using the second VCPU.

16. The computer system of claim 15, wherein the instructions that cause the processor to steer the first ingress packet towards the first RX queue cause the processor to:
   apply a first filter that is configured based on affinity of the following with the first NUMA node: (a) the first RX queue and (b) the first VCPU executing a first application.

17. The computer system of claim 16, wherein the instructions that cause the processor to steer the first ingress packet towards the first RX queue cause the processor to:
  apply the first filter to match the first ingress packet to the first RX queue based on one or more of the following associated with the first application: layer-2 information, layer-3 information, layer-4 information, and application-layer information.

18. The computer system of claim 16, wherein the instructions further cause the processor to:
  prior to receiving the first ingress packet and the second ingress packet, configure the first filter based on a request from the first application or a guest operating system (OS) running inside a virtualized computing instance connected to the VNIC.

19. The computer system of claim 16, wherein the instructions further cause the processor to:
  in response to detecting migration of the first VCPU from the first NUMA node to the second NUMA node, apply the first filter to steer a subsequent ingress packet that requires processing by the first VCPU towards the second RX queue or a third RX queue allocated with the second memory resources from the second NUMA node.

20. The computer system of claim 15, wherein the instructions further cause the processor to:
  prior to receiving the first ingress packet and the second ingress packet via a physical network interface controller (PNIC), attach the PNIC to both the first NUMA node and the second NUMA node via respective peripheral component interconnect express (PCIe) interfaces.

21. The computer system of claim 15, wherein the instructions further cause the processor to:
  prior to receiving the first ingress packet and the second ingress packet, allocate (a) a first queue set that includes the first RX queue with the first memory resources from the first physical memory on the first NUMA node, and (b) a second queue set that includes the second RX queue with the second memory resources from the second physical memory on the second NUMA node.

* * * * *